(12) United States Patent
Chane-Ching et al.

(10) Patent No.: US 7,674,834 B2
(45) Date of Patent: Mar. 9, 2010

(54) COLLOIDAL DISPERSION OF PARTICLES OF A RARE-EARTH VANADATE OR PHOSPHOVANADATE

(75) Inventors: Jean-Yves Chane-Ching, Eaubonne (FR); Thierry Le Mercier, Paris (FR)

(73) Assignee: Rhodia Electronics & Catalysis, La Rochelle (FR)

( * ) Notice: Subject to any disclaimer, the term of this patent is extended or adjusted under 35 U.S.C. 154(b) by 99 days.

(21) Appl. No.: 11/803,063

(22) Filed: May 11, 2007

(65) Prior Publication Data

US 2007/0213413 A1 Sep. 13, 2007

Related U.S. Application Data

(63) Continuation of application No. 10/489,283, filed as application No. PCT/FR02/03074 on Sep. 10, 2002, now abandoned.

(30) Foreign Application Priority Data

Sep. 12, 2001 (FR) .................................. 01 11792

(51) Int. Cl.
- *C09K 3/00* (2006.01)
- *B01F 3/12* (2006.01)
- *C09K 11/70* (2006.01)
- *C09K 11/77* (2006.01)
- *C09K 11/82* (2006.01)
- *C09K 11/83* (2006.01)

(52) U.S. Cl. ............. 516/89; 252/301.4 P; 252/301.4 F

(58) Field of Classification Search ................... 516/89; 252/301.4 P, 301.4 F
See application file for complete search history.

(56) References Cited

U.S. PATENT DOCUMENTS

| | | | |
|---|---|---|---|
| 3,441,512 A | 4/1969 | Durkee | 252/301.4 |
| 3,647,706 A | 3/1972 | Lagos | 252/301.4 |
| 3,789,014 A * | 1/1974 | Graff et al. | 252/301.4 P |

FOREIGN PATENT DOCUMENTS

| | | |
|---|---|---|
| FR | 2.104.977 | 4/1972 |
| WO | WO 00/76918 | 12/2000 |
| WO | WO 01/38225 A1 * | 3/2001 |

OTHER PUBLICATIONS

Derwent Abstract on East, week 200765, London: Derwent Publications Ltd., AN 2001-441420, Class A60, WO 0138225 A1, (Rhodia Electronic & Catalysis Inc[RHOD] , Rhodia Electronics & Catalysis[RHOD], Rhodia Terres Rares[RHOD]), abstract, pp. 1-11.*

A. Huignard, V. Buissette, G. Laurent, T. Gacoin, and J.-P. Boilot, "Synthesis and Characterizations of YVO4:Eu Colloids", Chem. Mater., 2002, 14 (5), pp. 2264-2269, (Publication Date (Web): Mar. 30, 2002).*

K. Riwotzki and M. Haase, "Wet-Chemical Synthesis of Doped Colloidal Nanoparticles: YVO4:Ln (Ln=Eu, Sm, Dy)", J. Phys. Chem. B, 1998, 102 (50), pp. 10129-10135, (Publication Date (Web): Nov. 14, 1998).*

M. Haase , K. Riwotzki, H. Meyssamy and A. Kornowski, "Synthesis and properties of colloidal lanthanide-doped nanocrystals", Journal of Alloys and Compounds vols. 303-304, May 24, 2000, pp. 191-197, (Available online May 17, 2000).*

* cited by examiner

*Primary Examiner*—Daniel S Metzmaier
(74) *Attorney, Agent, or Firm*—Buchanan, Ingersoll & Rooney P.C.

(57) ABSTRACT

The invention concerns a colloidal dispersion of a vanadate or a phosphovanadate of at least a rare earth comprising either a complex-forming agent having a pK higher than 2.5, or an anion of a monovalent acid, soluble in water and having a pKa ranging between 2.5 and 5. The dispersion is obtained by contacting a colloidal dispersion or a dispersion of initial complexes comprising at least a rare earth compound and at least a complex-forming agent or an anion of said monovalent acid and whereof the pH has been adjusted to a value of at least 7, with vanadate ions, then, in adjusting the pH of the resulting medium to a value of at least 9 and heating.

25 Claims, No Drawings

COLLOIDAL DISPERSION OF PARTICLES OF A RARE-EARTH VANADATE OR PHOSPHOVANADATE

This application is a continuation of U.S. application Ser. No. 10/489,283, filed on Aug. 18, 2004, now abandoned, which was filed under 35 U.S.C. §371 based on International Application No. PCT/FR02/03074, filed on Sep. 10, 2002, which claimed priority under 35 U.S.C. §119 to French Application No. 01 11792 filed Sep. 12, 2001. The entire contents of each of these applications are hereby incorporated by reference in this application.

The present invention relates to a colloidal dispersion of particles of a vanadate or phosphovanadate or at least one rare earth.

The fields of luminance and electronics are currently experiencing major developments. As an example of such developments, mention may be made of the development of plasma systems (screens and lamps) for novel display and illumination techniques. These novel applications require phosphor materials exhibiting ever improved properties. Thus, apart from their luminance property, these materials are required to have specific morphology or particle size characteristics so as in particular to make them easier to use in the desired applications.

More precisely, phosphors are required to be as far as possible in the form of individual particles and to be extremely small.

Colloidal sols or dispersions may constitute a useful way of obtaining such a type of product.

The object of the present invention is to provide a sol that can be used in particular in the fields of luminance and electronics and from which it is possible to obtain fine and highly deagglomerated products.

For this purpose, and according to a first embodiment of the invention, the dispersion is a colloidal dispersion of particles of a vanadate of at least one rare earth and is characterized in that the particles have a mean size of at most 6 nm and in that it comprises either a complexing agent having a pK (cologarithm of the dissociation constant of the complex formed by the complexing agent and said rare earth) of greater than 2.5, or an anion of a monovalent acid, soluble in water and having a pKa of between 2.5 and 5.

According to a second embodiment of the invention, the dispersion is a dispersion of particles of a phosphor vanadate of at least one rare earth, characterized in that it comprises either a complexing agent having a pK (cologarithm of the dissociation constant of the complex formed by the complexing agent and said rare earth) of greater than 2.5, or an anion of a monovalent acid, soluble in water and having a pKa of between 2.5 and 5.

The invention also relates to a method of preparing the dispersions described above, which is characterized in that it comprises the following steps:
either an initial colloidal dispersion of at least one rare-earth compound comprising at least one complexing agent or an anion of the aforementioned monovalent acid, the pH of said dispersion having been adjusted to a value of at least 7, or an initial dispersion of complexes, which is based on a rare-earth compound, a complexing agent or an anion of the aforementioned monovalent acid, which dispersion furthermore contains OH⁻ anions and the pH of which has been adjusted to a value of at least 7, is brought into contact with vanadate ions and also, if required, with phosphate ions;

the pH of the medium thus obtained after addition of the vanadate and, optionally, phosphate ions is adjusted to a value of at least 9; and said medium is heated.

The particles of the dispersion of the invention may have, according to alternative embodiments, a size of the order of a few nanometers and generally a uniform and well individualized morphology, which makes the dispersion particularly useful for applications involving phosphors.

Other features, details and advantages of the invention will become even more fully apparent from reading the description that follows and from the various specific but non-limiting examples intended to illustrate it.

The term "rare earth" is understood to mean throughout the description elements of the group formed by yttrium and those elements of the Periodic Table having an atomic number between 57 and 71 inclusive.

Throughout the description and unless otherwise indicated, the limits of the various intervals or ranges of values given are inclusive within these intervals or ranges.

The invention applies to dispersions or sols of particles of a vanadate or phosphovanadate of one or more rare earths. These are understood here to be particles essentially based on vanadates of formula $LnVO_4$ or phosphovanadates of formula $Ln(VO_4)_x(PO_4)_y$, with $x+y=1$, Ln denoting one or more rare earths.

Moreover, for the rest of the description the expression "colloidal dispersion or sol of a rare-earth vanadate or phosphovanadate" denotes any system consisting of fine solid particles of colloidal dimensions generally based on a vanadate or phosphovanadate of a rare earth within the meaning given above, which particles may be hydrated, and in suspension in an aqueous liquid phase. These particles may furthermore contain a certain amount of the complexing agent or of the anion of the monovalent acid that were mentioned above. They may also, optionally, contain residual amounts of bonded or adsorbed ions that may come from the rare-earth salts used in the preparation of the dispersion, such as, for example, nitrate, acetate, chloride, citrate or ammonium anions or sodium anions or else vanadate or phosphate anions ($HPO_4^{2-}$, $PO_4^{3-}$, $P_3O_{10}^{5-}$, etc.). It will be noted that, in such dispersions, the rare earth may be found either completely in the form of colloids or simultaneously in the form of ions, complexed ions and colloids. Preferably, at least 80% of the rare earth is in colloid form.

The aqueous liquid phase may also include the complexing agent or the monovalent acid or the anion of this acid, the aforementioned anions of the rare-earth salts and vanadate or phosphovanadate ions in various forms.

The term "complexing agent" in the present description denotes a compound or a molecule that can establish a covalent or ionic-covalent bond with the rare-earth cation. The complexing agents that are suitable within the context of the present invention are complexing agents with a high complex association constant Ks, the complex in question here being the complex formed by the complexing agent and the rare-earth cation. As an example of the equilibrium given below:

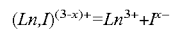

in which Ln denotes the rare earth, I the complexing agent and I⁻ the complexing anion, x being equal to 1, 2 or 3 depending on the state of ionization of the complex, the complex association constant Ks is given by the formula:

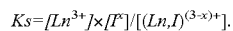

The pK is a cologarithm of Ks. The more stable the complex $(Ln,I)^{(3-x)+}$, the higher the value of pK.

The complexing agents that are suitable within the context of the present invention are those having a pK of greater than 2.5, preferably at least 3.

The complexing agent may in particular be chosen from hydroxyacids or polyhydroxyacids or salts thereof. As examples of hydroxyacids, mention may be made of glycolic acid or lactic acid, and as polyhydroxyacids, mention may be made of maleic acid and citric acid.

The complexing agent may also be chosen from aliphatic amino acids, preferably aliphatic polyamino acids, or salts thereof. As an example of such a complexing agent, mention may be made of ethylenediaminotetraacetic acid or nitrilotriacetic acid or else the sodium salt of —N,N-di(carboxymethyl)glutamic acid of formula $(NaCOO^-)CH_2CH_2$—$CH(COO^-Na)N(CH_2COO^-Na)_2$.

As other suitable complexing agents, it is possible to use polyacrylic acids and their salts, such as sodium polyacrylate and more particularly those whose weight-average molecular weight is between 2 000 and 5 000.

The complexing agent may either be in acid form or in ionized form.

Finally, it will be noted that one or more complexing agents may be present in the same dispersion.

According to the invention, the dispersion may also include the anion of a monovalent acid, soluble in water and having a pKa of between 2.5 and 5. The pKa is the cologarithm of the acid constant Ka of the acid in question. This acid may in particular be formic acid, propionic acid or monochloroacetic acid. Most particularly, it may be acetic acid. Here, again, several anions of monovalent acids may be present in the same dispersion.

As indicated above, the complexing agent and the aforementioned anion may be present as a mixture in the dispersion.

The content of complexing agent and/or of monovalent acid anion, expressed as the number of mols of complexing agent or of monovalent acid anion with respect to the number of rare-earth atoms, may vary. In particular, it may be between 0.01 and 0.25, more particularly between 0.05 and 0.21. This content is determined by carbon and rare-earth chemical assay of the colloids recovered after ultracentrifugation at 50 000 rpm for 6 hours. Such a content applies to the sum of the complexing agents or of the anions if several complexing agents or anions are present in the dispersion.

The molar ratio $VO_4/Ln$ or $(VO_4+PO_4)/Ln$ may also vary and may be, for example, between 0.7 and 1.2 and more particularly between 0.8 and 1.1.

The molar ratio $PO_4(VO_4+PO_4)$ may also vary and may be between, for example, 0 and 0.85 and more particularly between 0.6 and 0.8. These two ratios are determined by chemical assay of the chemical species in question on the colloids recovered after ultracentrifugation at 50 000 rpm for 6 hours.

The dispersions according to the first embodiment of the invention (vanadate) are nanoscale dispersions. By this is meant dispersions in which the colloids have a mean size of at most 6 nm and more particularly at most 5 nm. The colloidal particles may especially have a mean size of between about 3 nm and about 5 nm.

In the case of the second embodiment of the invention, the colloids may be of any size. However, according to one particular embodiment, their mean size is at most 20 nm, more particularly at most 10 nm. More particularly within the context of this second embodiment, the colloids may also have the mean size of those of the first embodiment and therefore the values given above.

The aforementioned sizes are determined by HRTEM (High Resolution Transmission Electron Microscopy), if necessary supplemented with cryomicroscopy.

Beside their small size, the colloids of the vanadate dispersions of the invention form little or no agglomerates. Analyses carried out by transmission electron cryomicroscopy on frozen specimens (the Dubochet technique) show a low degree of colloid agglomeration, for example less than 40%, more particularly less than 10% or even less than 5% in terms of number, that is to say, over all the objects or particles observed, at most 60%, more particularly at most 90% and even more particularly at most 95% of them are formed from a single crystallite. What was described in the case of the vanadate dispersions also applies here in the case of phosphovanadate dispersions whose mean particle size is at most 6 nm.

Furthermore, the colloidal particles are isotropic or substantially isotropic as regards their morphology. Their shape in fact approaches that of a sphere (completely isotropic morphology), as opposed to particles of acicular or plate-like shape.

In the dispersions of the invention, the rare earth may be any rare earth as defined above. However, the rare earth may more particularly be lanthanum, cerium, praseodymium, gadolinium, europium or yttrium. The invention applies particularly well to cases of dispersions of two rare earths, at least one of which is europium, especially in an Eu/Ln atomic ratio that may vary between 0.01/0.99 and 0.20/0.80, more particularly between 0.02/0.98 and 0.15/0.85, Ln denoting the rare earth other than europium. This second rare earth may in particular be yttrium or lanthanum.

The concentrations of the dispersions of the invention are generally at least 15 g/l, especially at least 20 g/l and more particularly at least 50 g/l, these concentrations being expressed as equivalent rare-earth vanadate or phosphovanadate concentrations. The concentration is determined after drying and calcination in air of a given volume of dispersion.

The method of preparing the dispersions of the invention will now be described.

As indicated above, the method of the invention comprises a first step in which the starting point is a colloidal dispersion of at least one rare-earth compound comprising at least one complexing agent or an anion of the aforementioned monovalent acid.

This colloidal dispersion consists of fine solid particles of colloidal dimensions generally based on an oxide and/or hydrated oxide (hydroxide) of the rare earth in suspension in an aqueous liquid phase, it being furthermore possible, optionally, for these particles to contain residual amounts of bonded or adsorbed ions such as, for example, nitrates, acetates, citrates and ammoniums, or the complexing agent in ionized form or the anion of the monovalent acid. It should be noted that in such dispersions the rare earth may either be completely in the form of colloids, or simultaneously in the form of ions, complexed ions and in the form of colloids.

This initial colloidal dispersion may have been obtained by any known means. Reference may in particular be made to European patent application EP 308311 that relates to dispersions of trivalent rare earths, particularly yttric ones. Added to the dispersions as obtained according to the teaching of that application are, for example, the complexing agent and/or the anion of the aforementioned monovalent acid. Mention may also be made as possible initial dispersions those described in WO 00/138225.

The method of the invention may also start with an initial dispersion of complexes, which is based on a rare-earth compound, on a complexing agent or on an anion of the aforementioned monovalent acid and that furthermore contains $OH^-$ ions.

It should be noted that such a dispersion may especially be prepared by forming an aqueous mixture comprising at least one rare-earth salt and either an aforementioned complexing agent or a monovalent acid, soluble in water and having a pKa of between 2.5 and 5, or else a mixture of the complexing agent and of the monovalent acid, and by adding a base to the mixture formed.

The rare-earth salts may be inorganic or organic acid salts, for example of the sulfate, nitrate, chloride or acetate type. It should be noted that nitrates and acetates are particularly suitable. As cerium salts, it is possible more particularly to use cerium (III) acetate, cerium (III) chloride or cerium (III) nitrate, and also mixtures of these salts such as acetate/chloride mixtures.

Such a preparation may be carried out by following the method described in WO 00/138225 but without carrying out the heating step.

The content of complexing agent or of monovalent acid anion in the initial dispersion, expressed as the number of mols of complexing agent or of monovalent acid anion relative to the number of rare-earth atoms may in particular be between 0.3 and 1.8, more particularly between 0.5 and 1.5.

According to one feature of the method, the pH of the initial dispersion was adjusted to a value of at least 7, more particularly between 7 and 9.5. This pH adjustment is carried out by adding a base. The amount of base used to obtain this pH is generally chosen so that the molar ratio $R_1$:OH/Ln is between 3.0 and 4.5, more particularly between 3.0 and 4.2, Ln denoting one or more rare earths.

As base, it is especially possible to use products of the hydroxide type. Mention may be made of alkali or alkaline-earth metal hydroxides and aqueous ammonia. It is also possible to use secondary, tertiary or quaternary amines. However, amines and aqueous ammonia may be preferred insofar as they reduce the risks of contamination by the alkali or alkaline-earth metal cations.

In the case of the preparation of a dispersion starting from a rare-earth salt that was described above, the amount of base added to the aqueous mixture must be such that the aforementioned pH condition is satisfied.

According to the method of the invention, the initial colloidal dispersion is brought into contact with vanadate ions and with phosphate ions in the case of the preparation of a dispersion of a phosphovanadate.

The vanadate ions are provided by solid compounds or solutions, for example in the form of ammonium monovanadate ($NH_4VO_3$) or sodium vanadate ($Na_3VO_4$) which are added to the initial dispersion. The phosphate ions may be provided by ammonium phosphates $(NH_4)_2HPO_4$ or $NH_4H_2PO_4$ or by sodium phosphates.

The addition is usually performed with stirring at room temperature. The vanadate/Ln or (vanadate+phosphate)/Ln molar ratio may vary. It is generally between 0.7 and 1.2, more particularly between 0.8 and 1.1.

According to the method of the invention, the pH of the mixture thus obtained is then adjusted to a value of at least 9, especially between 9 and 12.5. To adjust this pH, a base of the same type as that described above is used. The amount of base is generally chosen so that the ratio $R_2$:OH/Ln is between 1.2 and 5.0, Ln denoting one or more rare earths. In the case of the preparation of vanadate dispersions, the pH may more particularly be between 9 and 11. In the case of the preparation of phosphovanadate dispersions, the pH may more particularly be between 10.5 and 12.5.

The next step of the method consists in heating the mixture obtained after the previous step. The heating temperature is preferably at least 60° C. and more particularly at least 80° C. and may be up to the critical temperature of the reaction mixture. As an example, it may be between 80° C. and 140° C.

This heating or heat treatment may be carried out, depending on the temperature conditions adopted, either at standard atmospheric pressure or at a pressure such as, for example, the saturation vapor pressure corresponding to the temperature of the heat treatment. When the treatment temperature is chosen to be above the reflux temperature of the reaction mixture (that is to say generally greater than 100° C.), the operation is then carried out by introducing the aqueous mixture into a sealed chamber (a closed reactor more commonly known as an autoclave), the necessary pressure then resulting only from the heating of the reaction mixture (autogeneous pressure). Under the temperature conditions given above, and in an aqueous medium, it thus may be specified, by way of illustration, that the pressure in the closed reactor varies between a value of greater than 1 bar ($10^5$ Pa) and 165 bar ($165 \times 10^5$ Pa), preferably between 1 bar ($5 \times 10^5$ Pa) and 20 bar ($100 \times 10^5$ Pa). Of course, it is also possible to exert an external pressure that is then added to that arising from the heating.

The heating may be carried out either in an air atmosphere or in an inert gas atmosphere, preferably a nitrogen atmosphere in this case.

After the heating step, a colloidal dispersion according to the invention is then obtained directly.

According to a variant of the method of the invention, it is possible to wash and/or concentrate by ultrafiltration the dispersion obtained after the heating step and then to heat again the washed dispersion, under the same conditions as those described above and at a temperature that may more particularly be between 100° C. and 190° C.

This variant makes it possible to obtain products with an improved luminescence yield.

Finally, it is possible to subject the dispersion of the invention to subsequent treatments. One of these treatments consists in coating the particles of the dispersion with silica. This may be carried out by adding sodium silicate to the dispersion and then lowering the pH. This sodium silicate may have a Rm ($SiO_2/Na_2O$) of between 0.8 and 3.7. The final pH is, for example, between 8.5 and 10.5. The Si/Ln molar ratio is generally at most 10%.

The dispersions of the invention may be used in many applications. In particular, catalysis may be mentioned.

On account of the morphology and the fineness of the colloidal particles of which these dispersions are made, the latter are particularly suitable for use in the preparation of phosphor compounds or in the manufacture of luminescent devices, of the field-emission screen type or plasma or mercury-vapor systems for example. In the manufacture of these devices, the phosphors are processed using well-known techniques, for example screen printing, electrophoresis or sedimentation.

The dispersions of the invention may also be used so as to be deposited, possibly with other phosphors, in the form of transparent films on a glass or quartz substrate provided with transparent electrodes. This deposition may be carried out in particular by dipping or by spraying, optionally followed by calcination. Under appropriate excitation, these films thus obtained may emit colored light in the visible. The invention covers the device comprising such a substrate on which a transparent film obtained by depositing a dispersion according to the invention is placed.

Examples will now be given.

EXAMPLE 1

This example relates to the preparation of a colloidal dispersion of yttrium europium vanadate.

98.83 g of a $Y(NO_3)_3$ solution with an equivalent $Y_2O_3$ concentration equal to 21.6% by weight, i.e. 189 millimol of Y, were added to a beaker followed by 300 g of demineralized water. Next, 6.32 g of solid $Eu(NO_3)_3$ (18.9 millimol of Eu) were added with stirring. The Eu/Y molar ratio was equal to 1/10.

While stirring the above mixture, 36.15 g of citric acid: Prolabo quality. Mw=210.14 g (172 millimol of citric acid) were incorporated. The citric acid/(Y+Eu) molar ratio was 0.83. The total volume of the mixture was 390 ml.

To this mixture were added, with stirring and at room temperature, 253.536 ml of 3.28M (in terms of $OH^-$) $NH_4OH$ with a flow rate of 3.5 ml/min. After addition, the mixture was left with stirring for 30 min. The OH/(Y+Eu) molar ratio was then equal to 4. The pH of the dispersion was 8.5.

Added to a 500 ml aliquot containing 161.5 millimol of Y+Eu were 200 ml of a solution containing 23.76 g of sodium orthovanadate ($Na_3VO_4$, Mw=183.91 g) of Aldrich quality. The V/Y+Eu ratio was then equal to 0.8. The pH was 9.5.

The pH was adjusted to 10 by adding 36 ml of a 6M NaOH solution. The dispersion was stirred for 10 min.

The dispersion obtained was transferred into closed autoclaves (Parr bombes). The autoclaves were transferred to an oven preheated to a temperature of 120° C. The hydrothermal treatment lasted 16 hours.

After this hydrothermal treatment and cooling, a colloidal dispersion was collected.

The products were washed on ultrafiltration cells fitted with 3KD membranes in the following manner:

200 cm³ of demineralized water were added to 100 cm³ of dispersion and the mixture was ultrafiltered down to 100 cm³. The same operation was carried out again. The dispersion was thus washed by 4 equivalent volumes of water.

The dispersion was then concentrated by ultrafiltration down to a final volume of 25 cm³.

CryoMET characterization (using the Dubochet technique) demonstrated the presence of well separated nanoparticles having a size of approximately 3 nm.

EXAMPLE 2

This example relates to the preparation of a colloidal dispersion of yttrium europium phosphovanadate.

98.83 g of a $Y(NO_3)_3$ solution with an equivalent $Y_2O_3$ concentration equal to 21.6% by weight, i.e. 189 millimol of Y, were added to a beaker followed by 300 g of demineralized water. Next, 6.32 g of solid $Eu(NO_3)_3$ (18.9 millimol of Eu) were added with stirring. The Eu/Y molar ratio was equal to 1/10.

While stirring the above mixture, 36.15 g of citric acid: Prolabo quality. Mw=210.14 g (172 millimol of citric acid) were incorporated. The citric/(Y+Eu) molar ratio was 0.83. The total volume of the mixture was 390 ml.

To this mixture were added, with stirring and at room temperature, 261.5 ml of 3.18M (in terms of $OH^-$) $NH_4OH$ with a flow rate of 3.5 ml/min. After addition, the mixture was left with stirring for 30 min. The OH/Y+Eu molar ratio was then equal to 4. The pH of the yttrium europium dispersion was 8.4.

An alkaline cation phosphovanadate solution was produced in the following manner:

solution A: addition of 16.47 g of Prolabo diammonium hydrogen phosphate, $(NH_4)_2HPO_4$ of Mw=132.06 g, i.e. 124.7 millimol of P, into demineralized water give a total volume of 100 ml;

solution B: addition of 7.64 g of sodium orthovanadate $Na_3VO_4$ (Aldrich Mw=183.91 g), i.e. 41.5 millimol of V, into demineralized water to give a final volume of 70 ml; and addition of solution A to solution B.

The phosphovanadate solution then had a P/V molar ratio of 75/25.

The phosphovanadate solution thus prepared was added to the previous yttrium europium dispersion. The (P+V)/(Y+Eu) molar ratio was then equal to 0.8. The pH was 9.1.

The pH was adjusted to 11.3 by adding 170 ml of 6M NaOH solution. The dispersion was stirred for 10 min. The amount of sodium hydroxide added corresponded to an OH/(Y+Eu) molar ratio of 4.9.

The dispersion obtained was transferred into closed autoclaves (Parr bombes). The autoclaves were transferred to an oven preheated to a temperature of 95° C. The hydrothermal treatment lasted 16 hours.

After this hydrothermal treatment and cooling, a colloidal dispersion was collected.

The products were washed on ultrafiltration cells fitted with 3KD membranes in the following manner:

200 cm³ of demineralized water were added to 100 cm³ of dispersion and the mixture was ultrafiltered down to 100 cm³. The same operation was carried out again. The dispersion was thus washed by 4 equivalent volumes of water.

The dispersion was then concentrated by ultrafiltration down to a final volume of 25 cm³.

CryoMET characterization (using the Dubochet technique) demonstrated the presence of well separated nanoparticles having a size of approximately 3 nm.

The invention claimed is:

1. A colloidal dispersion of particles of a vanadate of at least one rare earth, said particles having a mean size of at most 6 nm and comprising either a complexing agent having a pK, said pK being the cologarithm of the dissociation constant of the complex formed by said complexing agent and said rare earth, of greater than 2.5, or an anion of a monovalent acid, soluble in water and having a pKa of between 2.5 and 5.

2. The dispersion as claimed in claim 1, wherein the particles have a degree of agglomeration of less than 40%.

3. The dispersion as claimed in claim 2, wherein the particles have a degree of agglomeration of less than 10%.

4. The dispersion as claimed in claim 1, being a dispersion of two rare earths, wherein the first rare earth of the vanadate or phosphovanadate is europium, and of the second rare earth is yttrium or lanthanum.

5. The dispersion as claimed in claim 1, wherein the monovalent acid is acetic acid.

6. The dispersion as claimed in claim 5, wherein the complexing agent is citric acid.

7. The dispersion as claimed in claim 1, wherein the vanadate of at least one rare earth is represented by the formula $LnVO_4$, wherein Ln is one or more rare earth elements.

8. The dispersion as claimed in claim 7, wherein Ln and $VO_4$ are present in relative amounts corresponding to a molar ratio of $VO_4/Ln=0.7–1.2$.

9. The dispersion of claim 7, wherein the dispersion has a concentration of particles of at least 15 g/l.

10. The dispersion of claim 9, wherein the dispersion has a concentration of particles of at least 20 g/l.

11. The dispersion as claimed in claim 1, wherein the particles have a mean size of at most 5 nm.

12. The dispersion as claimed in claim 1, wherein the particles have a mean size of about 3 nm to about 5 nm.

13. A colloidal dispersion of particles of a phosphovanadate of at least one rare earth, comprising either a complexing agent having a pK, said pK being the cologarithm of the dissociation constant of the complex formed by said complexing agent and said rare earth, of greater than 2.5, or an anion of a monovalent acid, soluble in water and having a pKa of between 2.5 and 5, said particles having a mean size of at most 20 nm.

14. The dispersion as claimed in claim 13, wherein the particles have a mean size of at most 6 nm.

15. The dispersion as claimed in claim 14, wherein the particles have a degree of agglomeration of less than 40%.

16. The dispersion as claimed in claim 15, wherein the particles have a degree of agglomeration of less than 10%.

17. The dispersion as claimed in claim 13, being a dispersion of two rare earths, wherein the first rare earth of the vanadate or phosphovanadate is europium, and of the second rare earth is yttrium or lanthanum.

18. The dispersion as claimed in claim 13, wherein the complexing agent is an acid, a polyhydroxyacid, a aliphatic amino acid, a polyacrylic acid or a salt of these said acids.

19. The dispersion as claimed in claim 18, wherein the complexing agent is citric acid.

20. The dispersion as claimed in claim 13, wherein the monovalent acid is acetic acid.

21. The dispersion as claimed in claim 13, wherein the phosphovanadate of at least one rare earth is represented by the formula $Ln(VO_4)_x(PO_4)_y$, wherein Ln is one or more rare earth elements, and $x+y=1$.

22. The dispersion as claimed in claim 21, wherein Ln and $(VO_4+PO_4)$ are present in relative amounts corresponding to a molar ratio of $(VO_4+PO_4)Ln=0.7-1.2$.

23. The dispersion of claim 21, wherein the dispersion has a concentration of particles of at least 15 g/l.

24. The dispersion of claim 23, wherein the dispersion has a concentration of particles of at least 20 g/l.

25. The dispersion as claimed in claim 13, wherein the particles have a mean size of at least 10 nm.

* * * * *